April 17, 1928.

F. M. VENZIE

BUILDING ELEMENT

Filed July 7, 1923

1,666,318

INVENTOR.
Frederick M. Venzie.
BY
ATTORNEY.

Patented Apr. 17, 1928.

1,666,318

UNITED STATES PATENT OFFICE.

FREDERICK M. VENZIE, OF PHILADELPHIA, PENNSYLVANIA.

BUILDING ELEMENT.

Application filed July 7, 1923. Serial No. 650,018.

This invention relates to a building composition principally for out-of-door use, and is designed to replace plaster and plaster compositions and to replace both wood and metal lath, thus greatly reducing cost of building operations. My composition may be made into slabs and it may be applied as a coating material and it has the advantage of resisting weather conditions so that it does not deteriorate and crumble as does plaster.

The invention consists of the improvements hereinafter described and finally claimed.

The nature, characteristic features and scope of the invention will be more fully understood when taken in connection with the accompanying drawings forming part hereof and in which:—

Figure 1:
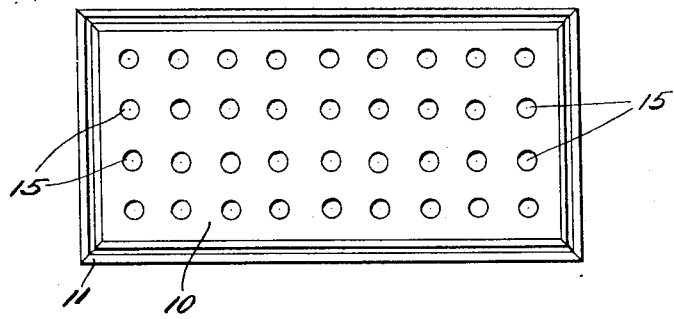
Fig. 1, is a face of a slab as formed from my improved compositon.
Figure 2:
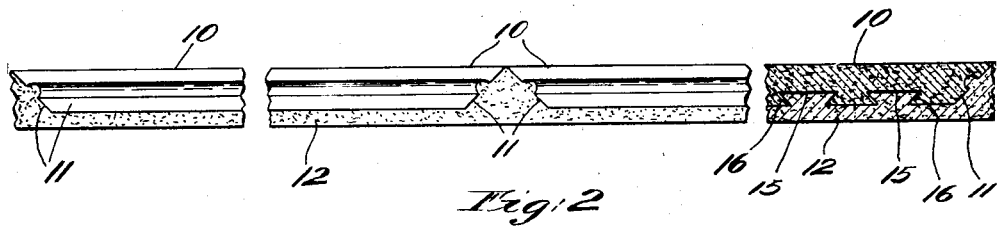
Fig. 2, is a top or plan view of a pair of such slabs positioned to receive a finishing coat of my improved material.

In manufacturing my building composition for slabs or coating for exterior building purposes I take saw-dust, granulated cork or granulated sponge in the proportion of about three parts, in bulk, to which I add and mix therewith about one part of Magnesite in dry, powdery form. To this dry, powdery mixture I now add about one part of chloride in liquid form. The composition is then moistened suitable for molding in slab form. I prefer to mold the slabs in the form shown in the drawings although obviously other forms may be utilized. The slab 10 is shown as having a bevellel marginal portion 11 entirely therearound. When the slabs are positioned as shown in Fig. 2, the adjacent bevelled parts form V-shaped parts to receive the finishing coat thus effecting a good bond. The finishing coat, which is designated 12, may be applied very thinly since the slab material in effect forms a "rough" coat. The slabs are porous, and not hard and brittle and may be nailed to partitions or otherwise positioned as by clips between vertical supports. The composition if desired may be used for general purposes similar to plaster instead of being formed into slabs. The composition is of fire and moisture resisting texture.

The finishing coat I prefer to use in connection with my above described composition is made in the manner following:—

I take about one part of Magnesite, about two parts of granulated asbestos, from one to two parts of sand and about one and one-half parts of liquid chloride and mix altogether by the addition of sufficient water to make a mortar-like consistency. This composition is used similar to plaster. In order to provide an anchor for the finishing coat I provide the bevelled face of my improved slab with a plurality of depressions designated 15 which are spread over the entire face of the slab but do not extend entirely through the slab. The walls of these depressions are inclined as at 16 so that a depression opening is of gradually increasing diameter as it nears a slab center. Thus the finishing coat readily anchors within such depressions.

What I claim is:—

A thin, rectangular slab for building purposes having a flat inner dished upper surface, said dished part being marginally bevelled, and the outer surface of said slab being bevelled in an opposite direction with the two bevelled parts coming together to form a sharp marginal edge, the flat upper surface of said slab being provided with a plurality of shallow depressions having inclined walls so arranged that the diameter of said depressions increase as they near the slab centre.

In testimony whereof I have hereunto signed my name.

FREDERICK M. VENZIE.